(12) United States Patent
Griebel (10) Patent No.: US 8,528,252 B2
(45) Date of Patent: Sep. 10, 2013

(54) SELF WATERING PLANT SYSTEM (76) Inventor: Arthur Francis Griebel, Phoenix, AZ (US)

( * ) Notice: Subject to any disclaimer, the term of this patent is extended or adjusted under 35 U.S.C. 154(b) by 232 days.

(21) Appl. No.: 12/541,158

(22) Filed: Aug. 13, 2009

(65) Prior Publication Data

US 2011/0036006 A1 Feb. 17, 2011

(51) Int. Cl.
*A01G 27/06* (2006.01)
(52) U.S. Cl.
USPC .................................................. 47/81
(58) Field of Classification Search
USPC .......................................... 47/81, 80, 79, 48.5
IPC ........................................................ A01G 27/04
See application file for complete search history.

(56) References Cited

U.S. PATENT DOCUMENTS

| | | | | | |
|---|---|---|---|---|---|
| 1,264,096 | A * | 4/1918 | Lelievre | ............................ | 47/81 |
| 3,786,598 | A * | 1/1974 | Stadelhofer | ...................... | 47/81 |
| 3,958,366 | A * | 5/1976 | Meyers | .............................. | 47/81 |
| 4,083,147 | A * | 4/1978 | Garrick | ............................. | 47/80 |
| 4,115,951 | A * | 9/1978 | Becker et al. | ..................... | 47/81 |
| 4,133,141 | A * | 1/1979 | Lee | .................... | 47/79 |
| 4,216,623 | A * | 8/1980 | Silver | ................................ | 47/80 |
| 4,299,054 | A * | 11/1981 | Ware | ................................ | 47/64 |
| 4,324,070 | A * | 4/1982 | Swisher | ........................... | 47/81 |
| 4,420,904 | A * | 12/1983 | Joswig et al. | ..................... | 47/81 |
| 4,782,627 | A * | 11/1988 | Hauk | ................................ | 47/81 |
| 4,864,771 | A * | 9/1989 | Fah | ................................. | 47/79 |
| 4,996,792 | A * | 3/1991 | Holtkamp, Sr. | ................... | 47/81 |
| 4,999,947 | A * | 3/1991 | Whitaker | ......................... | 47/81 |
| 5,046,282 | A * | 9/1991 | Whitaker | ......................... | 47/79 |
| 5,329,729 | A * | 7/1994 | Liang | ................................ | 47/81 |
| 5,678,600 | A * | 10/1997 | Locke et al. | .................. | 137/414 |
| 6,675,533 | B2 * | 1/2004 | Morlier et al. | ..................... | 47/81 |
| 2002/0017055 | A1 * | 2/2002 | Nalbandian et al. | ........... | 47/48.5 |
| 2002/0088177 | A1 * | 7/2002 | Gergek | .............................. | 47/79 |
| 2005/0060934 | A1 * | 3/2005 | Gelfer | ............................... | 47/81 |
| 2005/0144843 | A1 * | 7/2005 | Liao | .................................. | 47/79 |
| 2005/0252080 | A1 * | 11/2005 | Wright | .............................. | 47/79 |
| 2006/0150486 | A1 * | 7/2006 | Andu | ............................. | 47/48.5 |
| 2007/0089366 | A1 * | 4/2007 | Kasatshko | ........................ | 47/81 |
| 2007/0209279 | A1 * | 9/2007 | Pasquariello | ..................... | 47/81 |

(Continued)

FOREIGN PATENT DOCUMENTS

| | | | | |
|---|---|---|---|---|
| GB | 2223388 | A | * | 4/1990 |
| JP | 2004298173 | A | * | 10/2004 |
| JP | 2006197946 | A | * | 8/2006 |
| WO | WO 2004064497 | A1 | * | 8/2004 |

*Primary Examiner* — Son T Nguyen
*Assistant Examiner* — Shadi Baniani
(74) *Attorney, Agent, or Firm* — Bradley D. Crose; Crose Law LLC (57) ABSTRACT

This Self-Watering Planter comprises a wick, reservoir, wick-housing running between the soil/soil substitute and the reservoir, and a tight fitting cap to maintain a vacuum seal within the reservoir. The water or liquid mixture is maintained at a constant level across the wick by the vacuum that is created. This prevents water from flowing upwards into the soil when the soil is already wet. Liquid is only draw from the wick by osmosis when the soil is dry. Even as the water level in the reservoir drops, the water level across the wick continues to remain level until the reservoir is nearly empty, allowing the soil constant access to water until the reservoir needs refilling. Several embodiments are included. All contains these features, but some contain addition features as well as different proportions. The uses of the different embodiments are also described.

5 Claims, 9 Drawing Sheets

(56) References Cited

U.S. PATENT DOCUMENTS

2008/0263948 A1* 10/2008 Caron .............................. 47/80
2009/0056219 A1* 3/2009 Csoke .............................. 47/79
2009/0151246 A1* 6/2009 Watson et al. .................... 47/79
2009/0223124 A1* 9/2009 Pasquariello et al. .......... 47/66.1

* cited by examiner

SELF WATERING PLANT SYSTEM

BACKGROUND OF THE INVENTION

Non-self watering planters often require daily attention to check soil moisture and water as needed. If is also common for under and overwater to occur when the plants are not checked often enough of if too much water is given.

Several self-water planters and devices exist, but most do not adequately regulate the amount of water that is given to a plant. Wick systems tend to allow the soil to remain very wet when the reservoir is full and dry when the liquid in the reservoir runs low. Several self-water planters operate based on a vacuum, but they tend to lead to overwatering. When the filling lid is removed to fill the reservoir, water runs uncontrollable into the soil. Also typically, they rely on soil saturation to stop the flow of water.

SUMMARY OF THE INVENTION

It is an object of this invention to eliminate the large fluctuation in soil moisture that is seen in both wicks systems and non self-watering planters.

Another object of this invention is to use a simple design that is easy to use and to manufacture.

The objects of this invention are achieved by incorporating certain features from wick systems and vacuum systems in a way that eliminates the problems that are seen in both. A vacuum-sealed reservoir is used to suspend liquid so that it does not freely flow into the soil. A wick is used so that the water in the reservoir does not have direct contact with the soil, preventing soil saturation. The lower end of the wick is inside the reservoir. The middle section of the wick is also inside the reservoir, but is walled inside the wick housing, creating a buffer between the liquid in the reservoir and the soil. Water can only enter the middle section when the vacuum seal is broken. The top section of the wick is contained in the soil.

When the cap is removed from the reservoir the vacuum seal is broken, but water will not flow freely into the soil because all moisture must first pass through the wick. The narrow spaces between the wick fibers restrict the flow of water, allowing the operator time to fill the reservoir. When the cap is in place, a vacuum is created which prevents water from flowing into the wick housing. The only other time the vacuum seal is broken is during correct operation of the invention. After the soil becomes relatively dry it will begin to soak up water against the force of gravity via osmosis. As water is absorbed, the water level in the wick housing begins to drop. With a low water level in the wick housing, air can pass into the reservoir displacing liquid back into the wick housing. Once water is returned to the wick housing, the vacuum is created again and the flow of liquid into soil will stop until the soil becomes dry enough to soak up more liquid through the wick.

DETAIL DESCRIPTION

Figure 1:
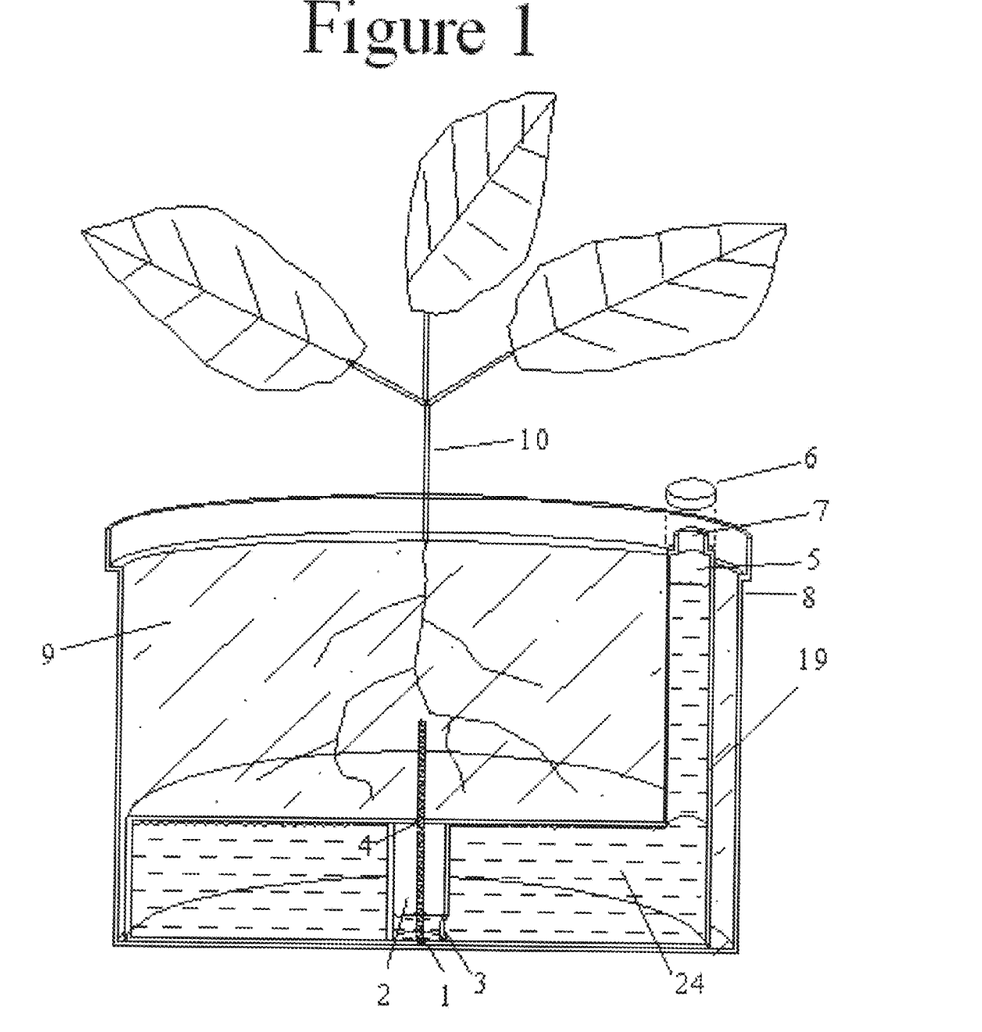
FIG. 1 is a cross sectional view of the invention.

In FIG. 1, a cross sectional view, the invention is shown in an embodiment that is inserted into any standard plant pot 8. The cap 6 is removed to pour liquid 24 through the spout 7, filling the reservoir 5. During filling, water is restricted from flowing freely into the soil 9 by the diameter of the hole 4 at the top of the wick housing 2. The hole 4 should be snug around the wick 1 so that liquid 24 must flow through the wick 1 to enter the soil 9. The hole 4 should not be so tight as to pinch off the flow of liquid 24. Since the wick 1 remains wet, organic materials such as cotton is would be prone to rot. For this reason, a non-organic material is recommended for the wick 1.

When the reservoir is full and the cap 6 is used to close the spout 7, a vacuum is created and liquid 24 cannot leave the reservoir until the vacuum is broken. In order to create the vacuum, the body of the reservoir 19 must be made of a non-porous material. Also, the cap 6 must make a tight seal with the spout 7. The vacuum seal is broken routinely under normal operation when liquid 24 flows up the wick 1 into the soil 9, causing the liquid 24 inside the wick housing 2 to drop below the top of the opening 3 located in the wick housing 2. During this stage, air enters the reservoir through the opening 3, breaking the vacuum. Gravity then forces liquid 24 back into the wick housing 2. Once the liquid 24 rises above the opening 3, the vacuum seal is reestablished. The cycle repeats when water begins to flow up the wick, giving the plant 10 constant access to water as long as the reservoir contains liquid 24.

When the soil 9 becomes dry, water is absorbed at a faster rate between the wick tissue and the soil 9 due to osmosis. Likewise after the moisture between the wick 1 and the soil 9 become equal, the flow of liquid 24 stops. Water disperses throughout the soil 9 by the same capillary action that causes water to flow up the wick 1. Once the soil medium is about as moist as the wick, osmosis stops and does not continue until the plant 10 uses the moisture in the soil 9 and the soil 9 becomes dry again. In this way, the plant 10 is protected from both over and under watering.

Figure 2:
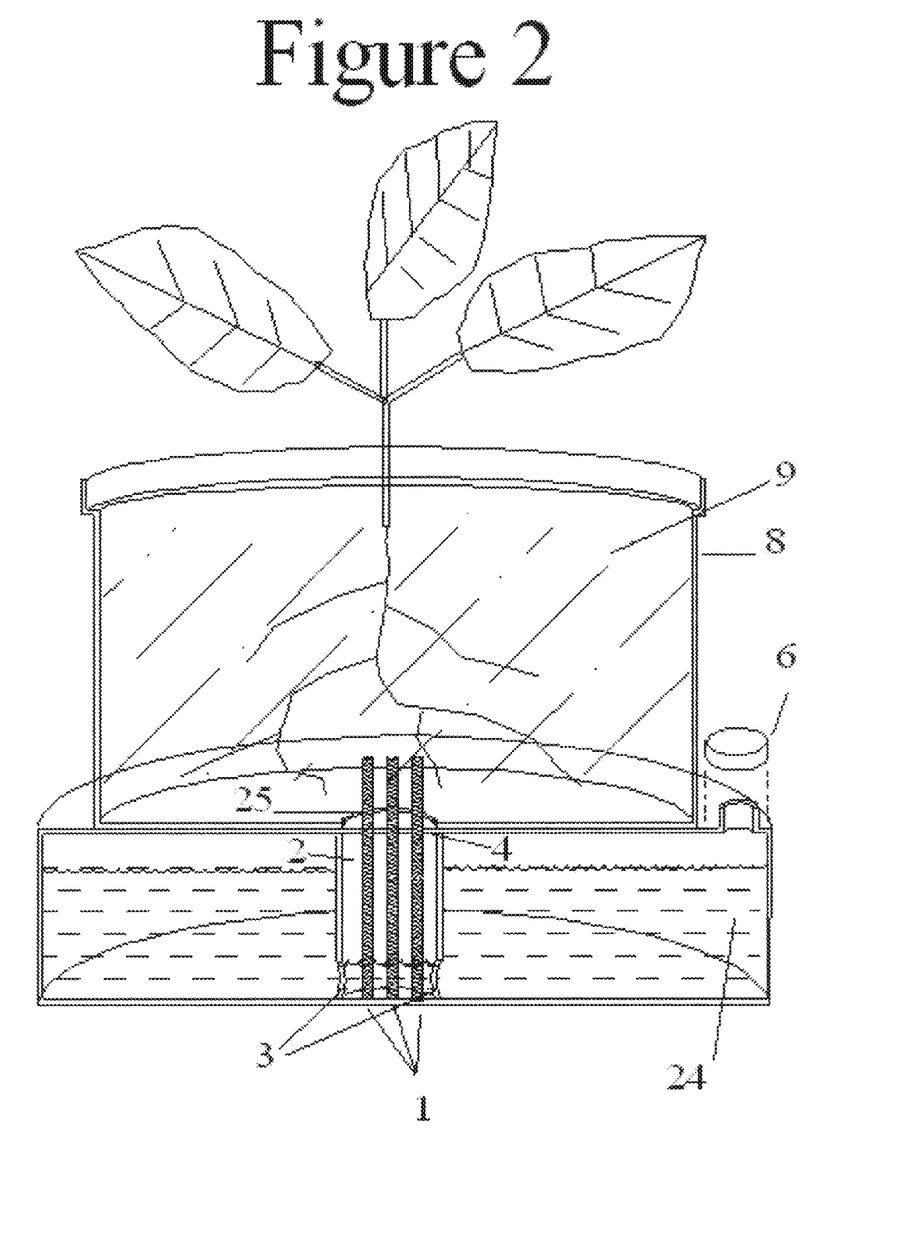
FIG. 2 is a cross sectional view of another embodiment of the invention with multiple wicks.

In FIG. 2, the plant pot 8 is placed directly on top of the invention with the wicks 1 running up through the drainage hole 25 at the bottom of the pot 8. This allows several plant pots 8 to be easily be swapped out on the same Self Watering Plant System without repotting.

Three wicks 1 are included in this embodiment. The purpose would be for creating a greater distribution area for liquid 24 into the soil 9 for when a sandy or other soil with poor capillary properties is used.

The flow of liquid 24 up the wick 1 is controlled by several forces. Gravity restricts the flow upwards while the capillary action of the wick 1 pulls water up along the length of the wick 1. In order to reduce the amount of moisture that is present, the force of gravity may be increased in relation to the capillary action. An embodiment with a large distance between the opening 3 at the bottom of the wick housing 2 and the hole 4 at the top of wick housing 2 offers greater resistance to the flow of liquid 24 against the force of gravity. A way to combat the force of gravity, a wick 1 with an increased diameter increases the force of the capillary action. Adjusting these features allows one embodiment of the Self Watering Plant System to keep the soil more moist than another embodiment; for instance, increasing both the wick diameter and decreasing the distance between the openings 3 and 4 on both ends of the wick housing 2 will cause greater moisture to flow into the soil 9 than if the reverse were true. This is due to the increased force of capillary action and the reduced force of gravity. By including three wicks 1 in this embodiment, there is a greater combined width of the wick 1. This also results in greater capillary action and thus wetter soil 9 than if one of the wicks 1 were used.

In order to prevent liquid 24 from flowing freely into the soil 9 when the cap 6 is removed, each wick 1 must have a separate hole 4 at the top of the wick housing 2. This embodiment includes two openings 3 at the bottom of the wick housing 2. There is no additional benefit for this when the openings 3 are of the same height. The extra opening was included in FIG. 2 to display that any number of openings may be used.

Figure 3:
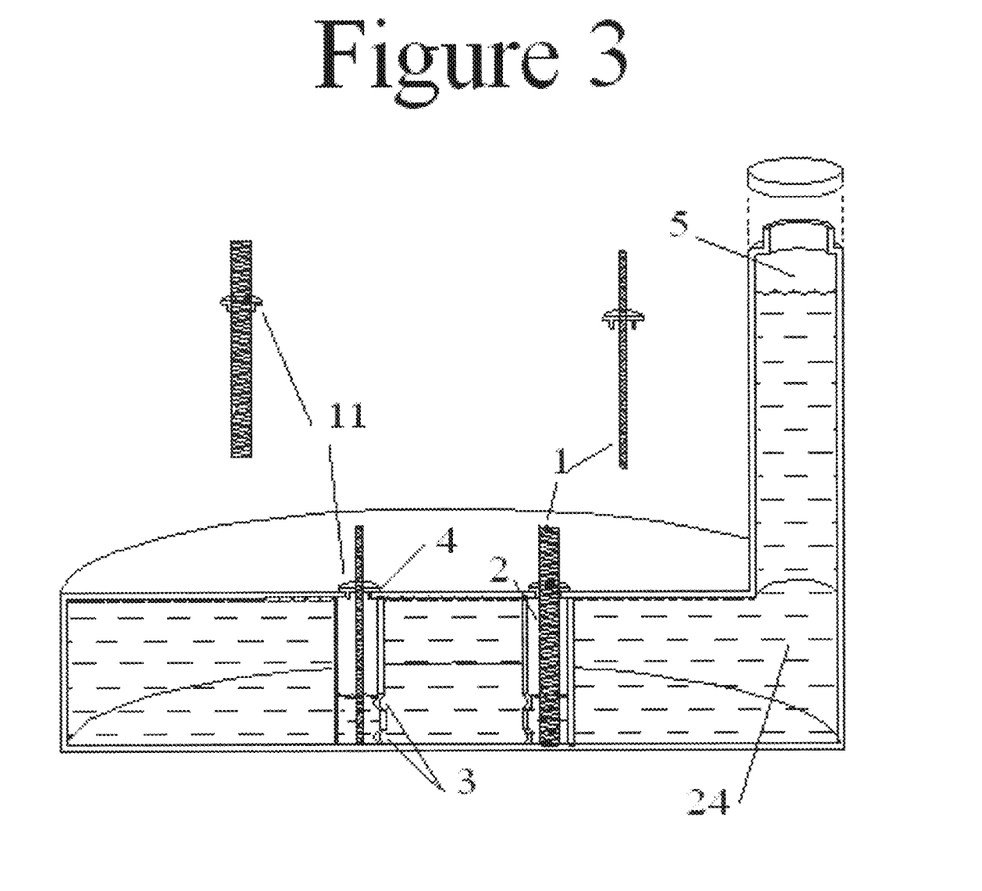
FIG. 3 is a cross sectional view of another embodiment of the invention with interchangeable wicks for different watering needs.

In the embodiment show in FIG. 3, two wick housings 2 are included. Each housing 2 has two openings 3 at the bottom. The lower holes 3 are flush with the bottom of the reservoir 5 so that liquid 24 will continue to flow into the wick housing 2 until the reservoir 5 is completely dry. The top opening 3 allows liquid to flow up to that level when the reservoir is full or at least the same level as the top of the top opening 3. One large opening 3 would serve the same purpose.

The benefit of using two wick housings 2 is to allow the wicks 1 to transport water into the soil at a greater distance apart. The cons of have two wick housings 2 is that when the roots of the plant 10 absorb liquid 24 more quickly out of one side of the invention, the liquid 24 may flow up both wick housings 2 when the liquid 24 has only fallen below the top of the opening 3 in one of the wick housings 2. The result is liquid rising higher than the top of opening 3 in one of the housings 2. Consequently, the side where the soil was wetter from the start will receive more watering than the side where the liquid 24 was depleted. When the two wick tubes 2 are relatively close to each other, this will be auto corrected. Water will flow more rapidly up the tube with a shorter distance between the level of the liquid 24 in the wick housing 2 and the hole 4 at the top of the housing until the liquid levels in both housings are equal. However, this results in less consistent watering. As a result several wick tubes 2 are not recommended for long planters with multiple plants.

FIG. 3 also displays another feature, interchangeable wicks 1 that are fitted using wick holder 11. In this embodiment, the hole 4 at the top of the wick housing 2 is larger than the diameter of the wick. The wick holder 11 fits snuggly into the hole 4 at the top of the wick housing 2. The center of the wick holder 11 has an opening where the wick 1 fits snuggly as well. Wicks 1 of different thicknesses fit into wick holders 11 with holes of corresponding thickness. The outer diameters of the wick holders 11 are the same so that they will fit into the same hole 4 at the top of the wick housing 2. The result is that one Self Watering Plant System may be changed out with a thin wick 1 or a thick wick 1. As described under FIG. 2, a thicker wick 1 has a greater capillary action and results in a wetter wick 1 near the soil. This allows one Self Watering Plant System to be sold for use with both water-loving plants as well as for plants requiring less moisture. The wick holder 11 may be used with an embodiment with one or several wicks 1.

Figure 4:
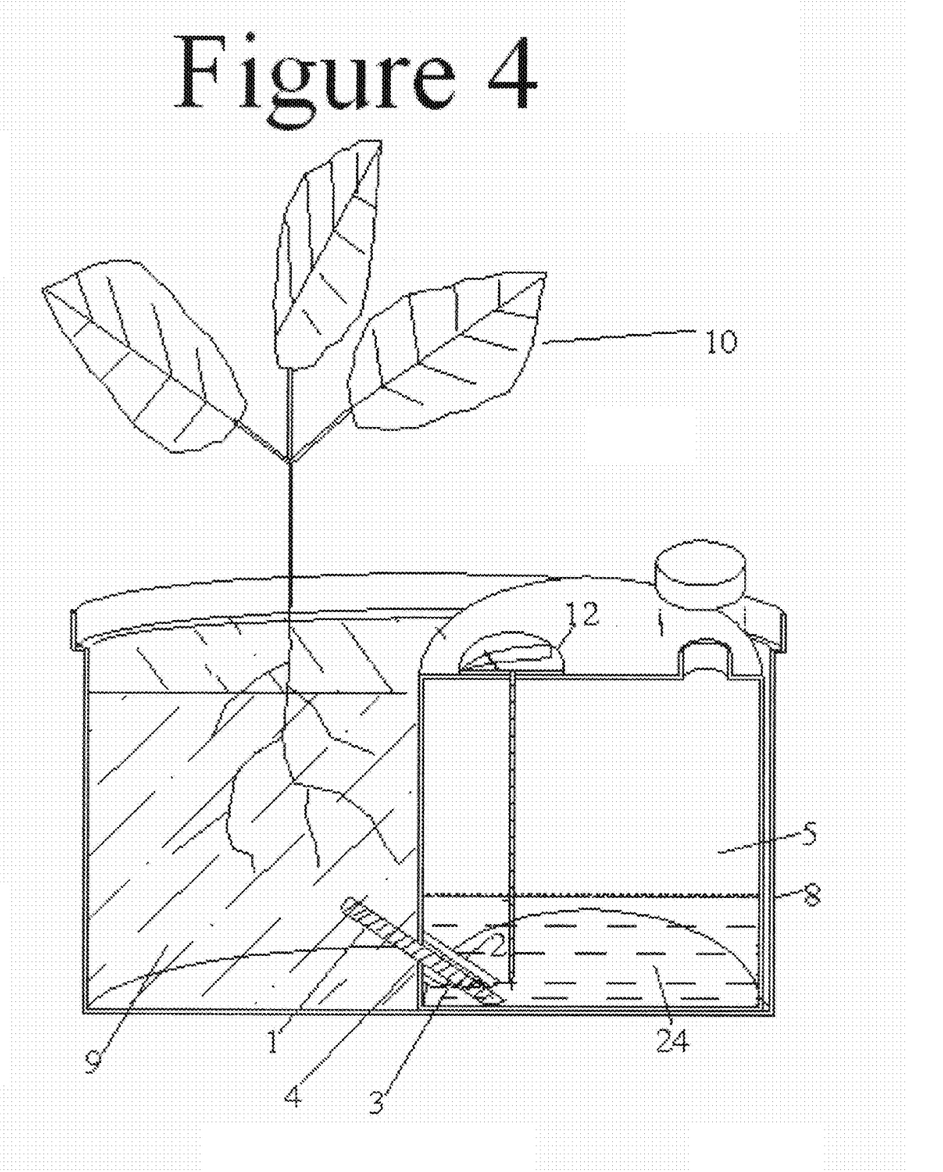
FIG. 4 is a cross sectional view of another embodiment of the invention with a water sensor.

FIG. 4 shows an embodiment with a wick 1 protruding from the side of the body of the reservoir 19. The purpose is that this embodiment is easier to insert into an existing potted plant 10. Soil 9 may be removed from the side of an existing pot 8 and the invention inserted without disturbing as many roots as if soil 9 were to be removed from both the side and the bottom.

Also in this figure, the opening 3 at the bottom of the wick housing 2 faces downwards instead of on the side of the wick housing 2. Due to this, the wick housing 2 does not extend down to the bottom of the body of the reservoir 19. Watering is not affected by either placement. However, the level of the top of the opening 3 does affect watering. If the opening 3 were lower, there would be a greater distance between the lower opening 3 and the hole 4 at the top of the wick housing 2. As stated previous, this would result in increased resistance in the flow of liquid up the wick 1 and thus drier soil 9.

At the top surface of the invention, a water sensor 12 is also present in this embodiment. This is completely optional for showing the amount of liquid 24 that is present in the reservoir 5. Any existing sensor may be used, provider that the seal between the sensor 12 and the body of the reservoir 19 is airtight.

Figure 5:
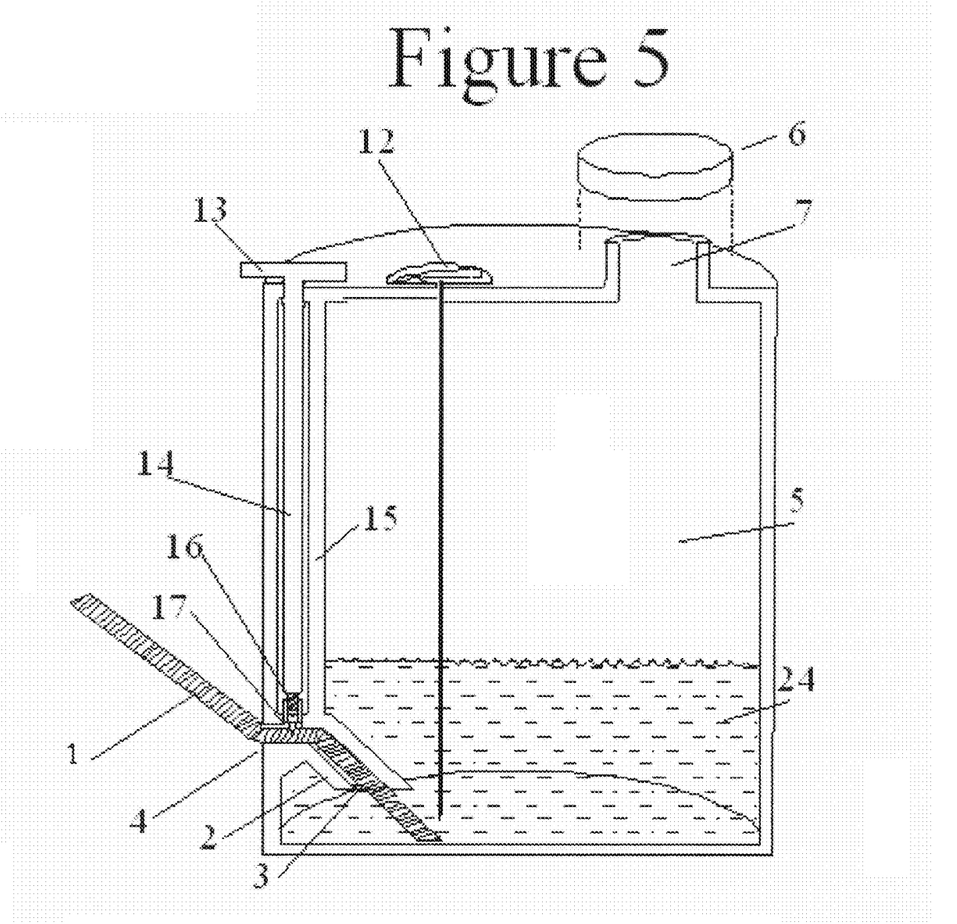
FIG. 5 is a cross sectional view of another embodiment of the invention with an adjustment knob to control how wet the soil is.

FIG. 5 is similar to FIG. 4, but with one added feature. This embodiment includes a mechanism for easily adjusting the amount of moisture present in the wick 1. Adjustment knob 13 can be turned one way to pinch the wick 1 and the other way to return the wick 1 to normal. Attached to the adjustment knob 13 is a bar 14 with threads 16 on the end nearest the wick 1. When turned, the threads 16 move the adjustment pointer 17 towards and away from the wick 1, causing the wick 1 to be pinched when the adjustment pointer 17 presses into it. The pinching has the same effect as using a wick 1 with a smaller diameter. The wick 1 will have less moisture present on the side of the wick 1 opposite of the reservoir 5 due to a decrease in capillary action. The adjustment bar housing 15 prevents liquid 24 in the reservoir 5 from contacting the wick 1 on the upper end of the adjustment pointer 17. To prevent liquid 24 from rising inside the adjustment housing 15 when the cap 6 is not securely fasted to the spout 7, the wick housing 2 must be snug against the wick 1 between the opening 3 at the bottom of the wick housing 2 and the adjustment pointer 17. The hole 4 at the top of the wick housing 2 must also be snug so that soil does not run down the wick housing 2 and interfere with the adjustment pointer 17.

As seen in FIG. 4, a water sensor 12 is also present in this embodiment. This way the user need not open the cap 6 to check if liquid 24 is remaining in the reservoir.

Figure 6:
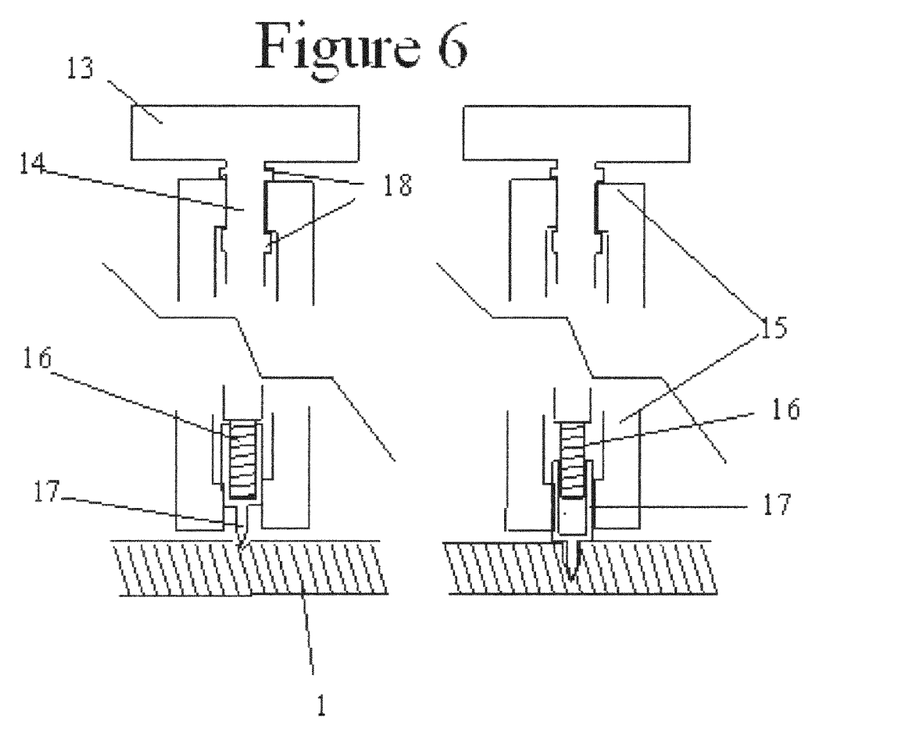
FIG. 6 is a cross sectional view of the adjustment mechanism used in FIGS. 5 and 7.
Figure 9:
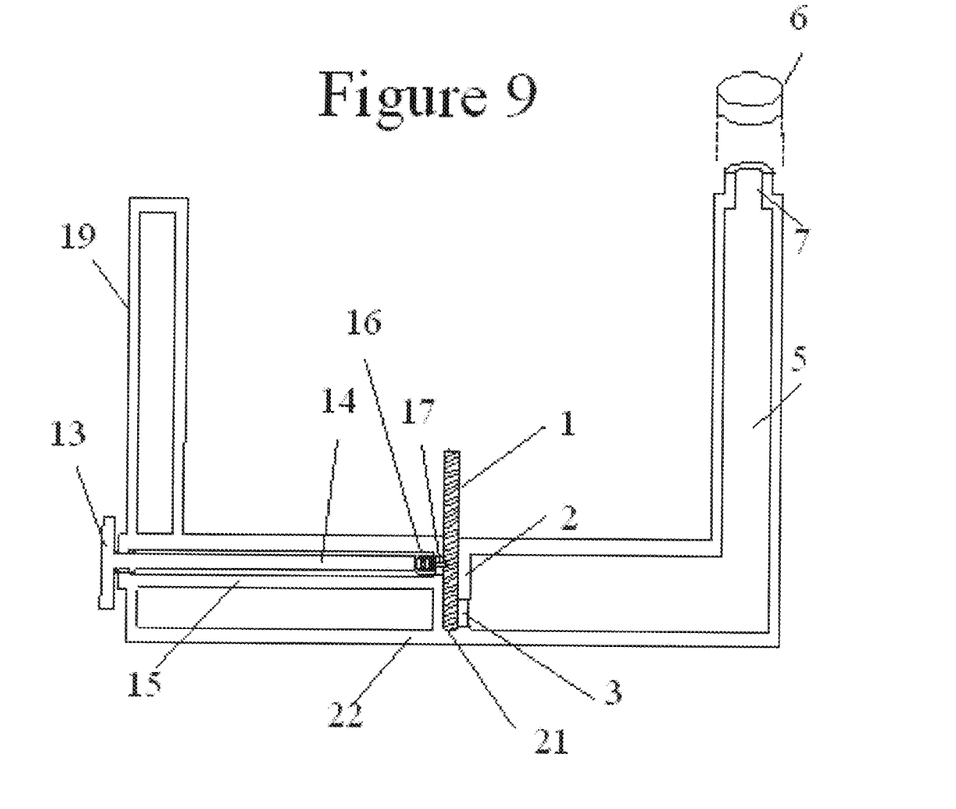
FIG. 9 is a cross sectional view of the embodiment shown in FIG. 8. It shows how the adjustment knob can be used when the reservoir encloses all sides of the soil.

FIG. 6 shows a close up of the adjustment mechanism described in FIG. 5 as well as in FIG. 9. When the adjustment knob 13 is turned the bar 14 is also turned. A mechanism of preventing the bar from sliding in and out of the adjustment housing 15 is required. In this embodiment, two areas of increased diameter 18 around the bar 14 is used to hold the bar 14 in place. On the bar 14, threads 16 are present that fit to the adjustment pointer 17. The adjustment pointer 17 must not spin with the bar 14 in order for the threads 16 to push and pull the adjustment pointer 17. The adjustment pointer 17 is held in place in this embodiment by having a box shape. The adjustment housing 15 contains a square shaped whereby the adjustment pointer 17 fits snuggly. When the adjustment knob 13 is turned, the threads cause the adjustment pointer 17 to move up and down against the wick 1. The result is increased resistance against the flow of liquid 24 through the wick 1 when the adjustment pointer 17 is depressed.

Figure 7:
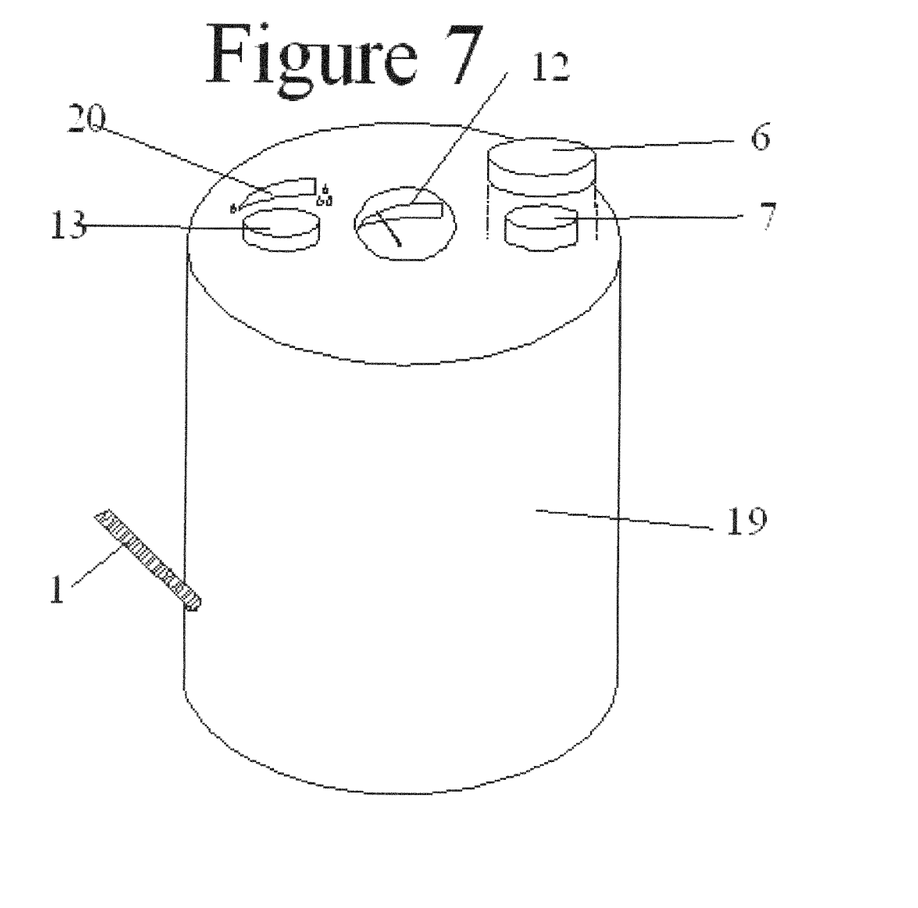
FIG. 7 is a perspective view of FIG. 5.

FIG. 7 shows a perspective view of the embodiment shown in FIG. 5, where 13 is the adjustment knob and 20 is an adjustment reader. The adjustment reader 20 allows the user to see if the adjustment knob 13 has been turned to increase or decrease the amount of moisture that is to be present in the wick 1. A water sensor 12, cap 6, and filling spout 7 are also present on the top wall of the body of the reservoir 19.

Figure 8:
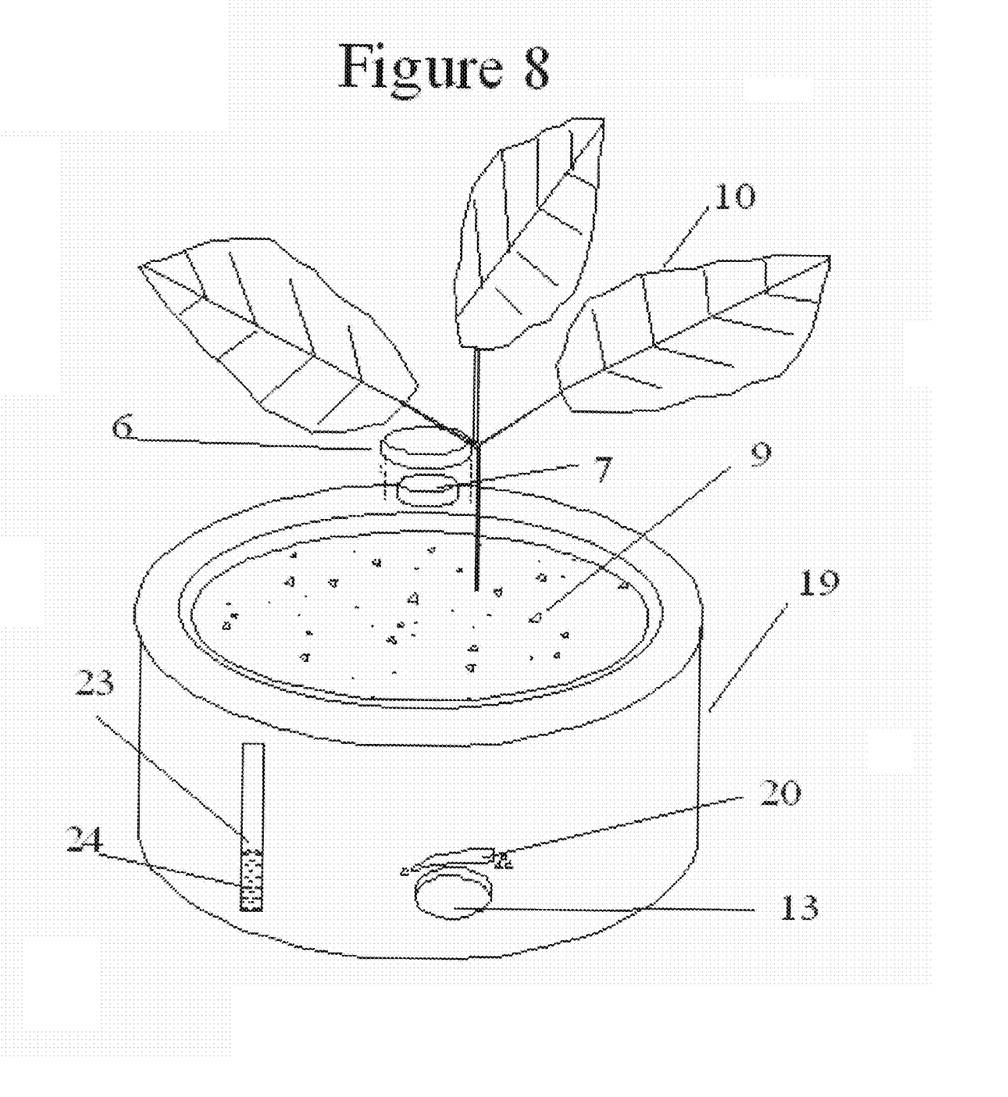
FIG. 8 is a perspective view of the invention with an embodiment where a separate plant pot is not needed. An adjustment knob for watering and a mechanism for displaying the water level are also shown.

FIG. 8 is a perspective view of an embodiment where the reservoir encompasses the soil 9 on all sides as well as below the soil 9. A clear panel 23 is located on the side of the body of the reservoir 19 so that the level of the liquid 24 within the reservoir may be seen. The cap 6 and spout 7 is located at the top of the reservoir as it is in other embodiments. An adjustment knob 13 is present as well as an adjustment reader 20 so that the wetness of the soil may be altered as needed based on the needs of the plant 10.

FIG. 9 is a cross sectional view of FIG. 8, allowing for a view of the adjustment bar 14 and adjustment pointer 17. Like FIG. 5, the adjustment knob 13 turns a bar 14 and threads 16 so that the adjustment pointer 17 will compress the wick. This action will reduce the moisture present in the portion of the wick 1 that is above the adjustment pointer 17 and runs into the soil 9. Also as in FIG. 5, the wick housing 2 must be snug between the opening 3 at the bottom of the wick housing 2 and the adjustment pointer. If this is not snug, liquid will run through the adjustment housing 15, past the adjustment knob 13 and out of the side of the reservoir 19 when the cap 6 is not securely fastened to the spout 7.

The invention claimed is:

1. A self-watering plant system configured to automatically transmit liquids to a growing soil medium, the system comprising:
    a refillable reservoir said reservoir having an adjustment bar housing inside an interior of said reservoir configured to store a liquid;
    a cap configured to tightly seal the reservoir;
    a wick having a lower portion, middle portion, and upper portion, the lower portion fully disposed within the reservoir, the lower portion in direct contact with the liquid stored in the reservoir, the middle portion precluded from direct contact with the liquid stored in the reservoir;
    a wick housing configured to create a barrier between the middle portion of the wick and the liquid stored within the reservoir such that the middle portion of the wick is precluded from direct contact with the liquid; wherein the wick is configured to transmit the liquid from the reservoir wherein a lower portion of the wick is disposed and configured for direct contact with the liquid to the soil medium, wherein the wick passes from the reservoir through the wick housing, and into the soil medium at the upper portion of the wick;
    a wick housing ingress opening disposed at the base of the wick housing and which opens into a lower portion of the reservoir; and
    a wick housing egress opening which leads to the soil medium;
    wherein the wick housing is configured to house the wick within the wick housing and the wick housing ingress opening; and the wick housing disposed above the wick housing ingress opening for a vertical distance for a predetermined distance creating a chamber around the middle portion of the wick, in which air travels down into the reservoir, thus configured to break a vacuum contained within the reservoir, when liquid has been removed from the ingress opening of the wick housing, and to create a uniform buffer between the soil and the liquid contained in the reservoir, thereby configured to prevent both excessive and insufficient deliveries of liquid; a reservoir ingress opening at or near the top for insertion of a liquid, wherein the reservoir is vacuum tight when the cap is in place and liquid in the reservoir obstructs the entrance to the wick housing, wherein the reservoir is configured for placement in close proximity to soil; an adjustment knob, configured to adjust an amount of pressure; a bar which runs from the adjustment knob towards the wick, said bar housed in said adjustment bar housing; a means to apply and maintain a pressure on the wick at a location where the wick passes through an airspace between the liquid in the reservoir and the soil; an adjustment pointer, located at the end of the bar nearest the wick, that moves towards and away from the wick with the bar, thereby configured to apply and remove pressure, but not turn with the bar, thus configured to avoid damage to the wick; a plurality of threads disposed on said bar, said plurality of threads fit into said adjustment pointer, thereby configured to allow pressure to be applied or removed via a screw mechanism.

2. The self-watering plant system according to claim 1, wherein the cap creates an air tight seal with the reservoir ingress opening of the reservoir.

3. The self-watering plant system according to claim 1, wherein the wick housing egress opening is defined with a width for the wick to pass through, as well as liquid through the wick and to restrict excess flow of liquid around the sides of the wick when a vacuum is not in place.

4. The self-watering plant system according to claim 1, wherein the wick is comprised of an absorbent material configured to transport liquid via capillary action, is configured for partial immersion in the liquid contained within the reservoir, and is configured to pass from inside the lower end of a reservoir, through the wick housing ingress opening, through the wick housing, and out through the wick housing egress opening.

5. The self-watering plant system according to claim 1, wherein the adjustment pointer further comprises:
    a circular end that fits with a complementary circular end on the bar, configured to allow the two parts to spin separately;
    a non-circular circumference, and a non-circular complimentary passage within the planter, configured to prevent the adjustment pointer from spinning.

* * * * *